(12) United States Patent
Chae et al.

(10) Patent No.: US 10,531,460 B2
(45) Date of Patent: Jan. 7, 2020

(54) METHOD AND APPARATUS FOR TRANSRECEIVING MESSAGES FROM V2X TERMINAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/761,292

(22) PCT Filed: Sep. 19, 2016

(86) PCT No.: PCT/KR2016/010419
§ 371 (c)(1),
(2) Date: Mar. 19, 2018

(87) PCT Pub. No.: WO2017/048101
PCT Pub. Date: Mar. 23, 2017

(65) Prior Publication Data
US 2018/0270822 A1    Sep. 20, 2018

Related U.S. Application Data

(60) Provisional application No. 62/374,710, filed on Aug. 12, 2016, provisional application No. 62/373,972, (Continued)

(51) Int. Cl.
*H04W 72/04*    (2009.01)
*H04W 28/04*    (2009.01)
(Continued)

(52) U.S. Cl.
CPC ....... *H04W 72/0453* (2013.01); *H04W 28/04* (2013.01); *H04W 72/02* (2013.01);
(Continued)

(58) Field of Classification Search
None
See application file for complete search history.

(56) References Cited

U.S. PATENT DOCUMENTS

2009/0262699 A1    10/2009  Wengerter et al.
2012/0250560 A1    10/2012  Chun et al.
(Continued)

FOREIGN PATENT DOCUMENTS

KR    1020110108284    10/2011
KR    1020140105692    9/2014
(Continued)

OTHER PUBLICATIONS

United States Patent and Trademark Office U.S. Appl. No. 15/760,536, Office Action dated Mar. 6, 2019, 16 pages.
(Continued)

*Primary Examiner* — Brian S Roberts
(74) *Attorney, Agent, or Firm* — Lee Hong Degerman Kang Waimey

(57) ABSTRACT

One embodiment of the present invention relates to a method for UE receiving data in a wireless communication system, the method for receiving data comprising the steps of: receiving control information through a channel through which the control information is delivered; and confirming an information bit which is included in the control information and is related to reserving a resource, wherein the information bit simultaneously indicates whether UE which has transmitted the control information reserves the resource, and if the resource is reserved by the UE, the location of the resource.

5 Claims, 10 Drawing Sheets

Related U.S. Application Data filed on Aug. 11, 2016, provisional application No. 62/336,563, filed on May 13, 2016, provisional application No. 62/318,755, filed on Apr. 5, 2016, provisional application No. 62/317,477, filed on Apr. 1, 2016, provisional application No. 62/316,556, filed on Mar. 31, 2016, provisional application No. 62/295,150, filed on Feb. 15, 2016, provisional application No. 62/292,216, filed on Feb. 5, 2016, provisional application No. 62/256,046, filed on Nov. 16, 2015, provisional application No. 62/251,100, filed on Nov. 4, 2015, provisional application No. 62/220,206, filed on Sep. 17, 2015.

(51) Int. Cl.
*H04W 72/02* (2009.01)
*H04W 72/12* (2009.01)
*H04W 4/40* (2018.01)
*H04W 92/18* (2009.01)

(52) U.S. Cl.
CPC ..... *H04W 72/042* (2013.01); *H04W 72/1289* (2013.01); *H04W 4/40* (2018.02); *H04W 92/18* (2013.01)

(56) References Cited

U.S. PATENT DOCUMENTS

| | | | |
|---|---|---|---|
| 2013/0259022 A1 | 10/2013 | Jitsukawa et al. | |
| 2013/0308549 A1 | 11/2013 | Madan et al. | |
| 2015/0004901 A1* | 1/2015 | Agiwal | H04W 76/14 455/39 |
| 2015/0036651 A1 | 2/2015 | Takeda et al. | |
| 2015/0282234 A1* | 10/2015 | Sartori | H04W 72/042 370/329 |
| 2016/0286570 A1* | 9/2016 | Chae | H04W 72/1263 |

FOREIGN PATENT DOCUMENTS

| | | |
|---|---|---|
| KR | 1020150017682 | 2/2015 |
| WO | 2013155253 | 10/2013 |
| WO | 2014178671 | 11/2014 |
| WO | 2015065015 | 5/2015 |
| WO | 2015113720 | 8/2015 |

OTHER PUBLICATIONS

European Patent Office Application Serial No. 16846921.1, Search Report dated Mar. 15, 2019, 11 pages.
Huawei, et al., "Introducing V2V to TS 36.331", 3GPP TSG RAN WG2 Meeting #95, R2-165780, Aug. 2016, 31 pages.
LG Electronics, "Support for V2V services based on LTE sidelink", 3GPP TSG RAN WG2 Meeting #95, R2-165839, Aug. 2016, 20 pages.
Motorola, "Introduction of V2V into TS36.213", 3GPP TSG RAN WG1 Meeting #86, R1-168226, Aug. 2016, 23 pages.
LG Electronics, "Detailed design of scheduling assignment for D2D communication", 3GPP TSG RAN WG1 Meeting #78, R1-143176, XP050788653, Aug. 2014, 5 pages.
LG Electronics, "Detailed design of signaling for D2D communication resource allocation", 3GPP TSG RAN WG1 Meeting #78, R1-143177, XP050788654, Aug. 2014, 5 pages.
LG Electronics, "Discussion on resource allocation for D2D mode 2 communication", 3GPP TSG RAN WG1 Meeting #78, R1-143179, XP050788656, Aug. 2014, 10 pages.
Huawei, et al., "Discussion on time-offset for D2D demodulation requirements", 3GPP TSG RAN WG4 Meeting #74, R4-150097, XP050937599, Feb. 2015, 6 pages.
PCT International Application No. PCT/KR2016/010417, International Search Report dated Dec. 13, 2016, 15 pages.
PCT International Application No. PCT/KR2016/010419, International Search Report dated Dec. 29, 2016, 30 pages.
Aydin, O. et al., "Final Report on Network-Level Solutions", ICT-317669-METIS/D4.3, Mar. 2015, 148 pages.
Qualcomm, "Reservation Signal Design for LAA", 3GPP TSG RAN WG1 Meeting #82, R1-153873, Aug. 2015, 1 page.
European Patent Office Application Serial No. 16846922.9, Search Report dated Apr. 5, 2019, 14 pages.
LG Electronics, "Discussion on group prioritization for D2D communication", 3GPP TSG RAN WG1 Meeting #80bis, R1-151510, XP050934382, Apr. 2015, 4 pages.

* cited by examiner

FIG. 5
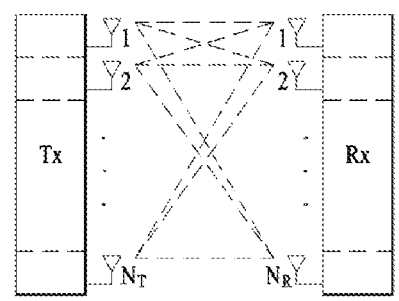
(a)
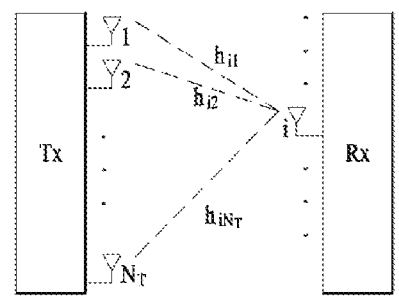
(b)

FIG. 8
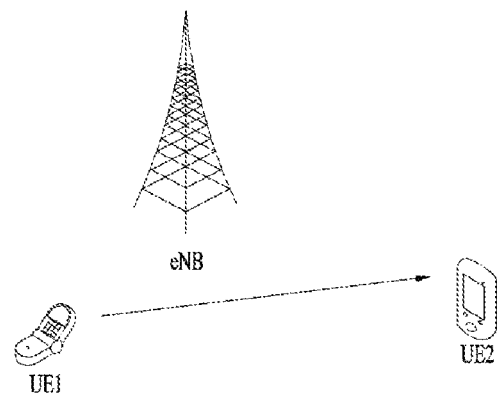
(a)
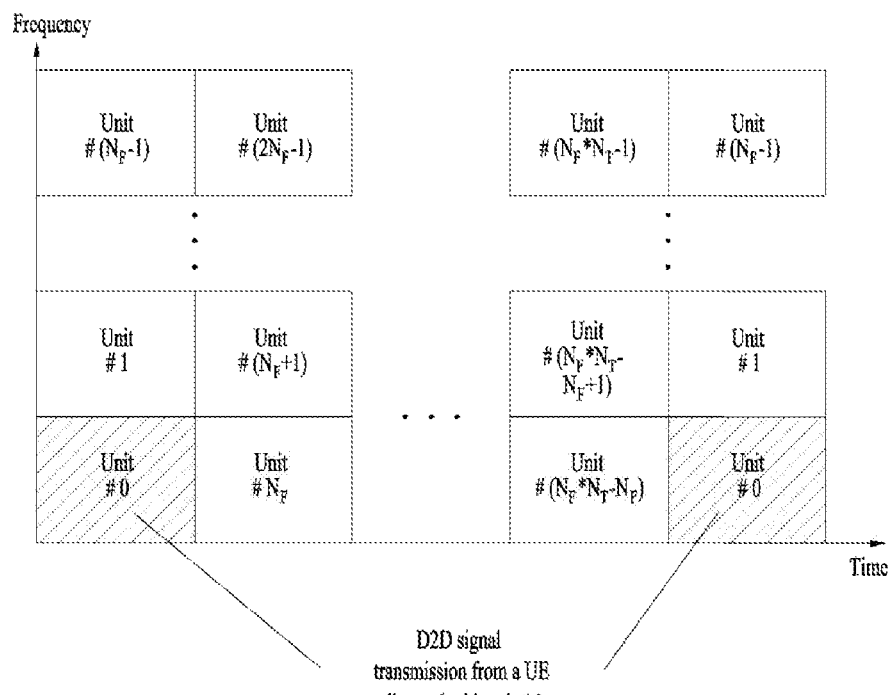
(b)

METHOD AND APPARATUS FOR TRANSRECEIVING MESSAGES FROM V2X TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2016/010419, filed on Sep. 19, 2016, which claims the benefit of U.S. Provisional Application No. 62/220,206, filed on Sep. 17, 2015, 62/251,100, filed on Nov. 4, 2015, 62/256,046, filed on Nov. 16, 2015, 62/292,216, filed on Feb. 5, 2016, 62/295,150, filed on Feb. 15, 2016, 62/316,556, filed on Mar. 31, 2016, 62/317,477, filed on Apr. 1, 2016, 62/318,755, filed on Apr. 5, 2016, 62/336,563, filed on May 13, 2016, 62/373,972, filed on Aug. 11, 2016, and 62/374,710, filed on Aug. 12, 2016, the contents of which are all hereby incorporated by reference herein in their entirety.

TECHNICAL FIELD

Following description relates to a wireless communication system, and more particularly, to a method for a V2X (vehicle to everything) UE (user equipment) to transmit control information and a message and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly without an evolved Node B (eNB). D2D communication may cover UE-to-UE communication and peer-to-peer communication. In addition, D2D communication may be applied to Machine-to-Machine (M2M) communication and Machine Type Communication (MTC).

D2D communication is under consideration as a solution to the overhead of an eNB caused by rapidly increasing data traffic. For example, since devices exchange data directly with each other without an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

DISCLOSURE OF THE INVENTION

Technical Task

A technical task of the present invention is to provide methods for a V2X UE to transmit control information and a message and various method related to resource reservation.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of receiving data, which is received by a UE in a wireless communication system, includes the steps of receiving control information through a channel on which the control information is forwarded, and checking an information bit related to resource reservation included in the control information. In this case, the information bit indicates whether or not a UE, which has transmitted the control information, reserves a resource and if the UE reserves a resource, the information bit indicates a position of the resource at the same time.

If the information bit corresponds to 0, the UE may assume that the UE, which has transmitted the control information, does not reserve a resource.

If the information bit corresponds to a value rather than 0, the UE may assume that the UE, which has transmitted the control information, reserves a resource and transmits data after a time period corresponding to the information bit is elapsed.

If the UE corresponds to a UE receiving data corresponding to the control information, the UE can decode data in a frequency resource identical to a frequency resource in which the data is received after the time period is elapsed.

If the UE corresponds to a UE not receiving data corresponding to the control information, the UE can exclude a frequency resource in which the data is received after the time period is elapsed when the UE selects a transmission resource.

A resource for the control information and a resource for data corresponding to the control information can always be selected at the same time.

The control information and data corresponding to the control information can be transmitted in a manner of being FDM.

To further achieve these and other advantages and in accordance with the purpose of the present invention, according to a different embodiment, a method of transmitting data, which is transmitted by a UE in a wireless communication system, includes the steps of selecting an information bit related to resource reservation to be included in control information, and transmitting the control information through a channel on which the control information is forwarded. In this case, the information bit can indicate whether or not the UE reserves a resource. If the UE reserves a resource, the information bit can indicate a position of the resource at the same time.

If the UE does not reserve a resource, 0 can be selected as a value of the information bit.

If the UE reserves a resource, a value rather than 0 can be selected as a value of the information bit and the UE can transmit data after a time period corresponding to the selected value rather than 0 is elapsed.

The data transmitted after the time period is transmitted in a frequency resource identical to a frequency resource in which data corresponding to the information bit is transmitted and can be decoded by a UE, which has received data corresponding to the control information.

A frequency resource of the data transmitted after the time period can be excluded when a UE not receiving data corresponding to the control information selects a transmission resource.

A resource for the control information and a resource for data corresponding to the control information can always be selected at the same time.

The control information and data corresponding to the control information can be transmitted in a manner of being FDM.

Advantageous Effects

According to the present invention, a UE is able to transmit and receive a message in environment in which congestion control is appropriately performed.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for a configuration of a wireless communication system having multiple antennas;

FIG. 8 is a diagram for an example of a D2D resource pool for performing D2D communication;

BEST MODE

Mode for Invention

Figure 1:
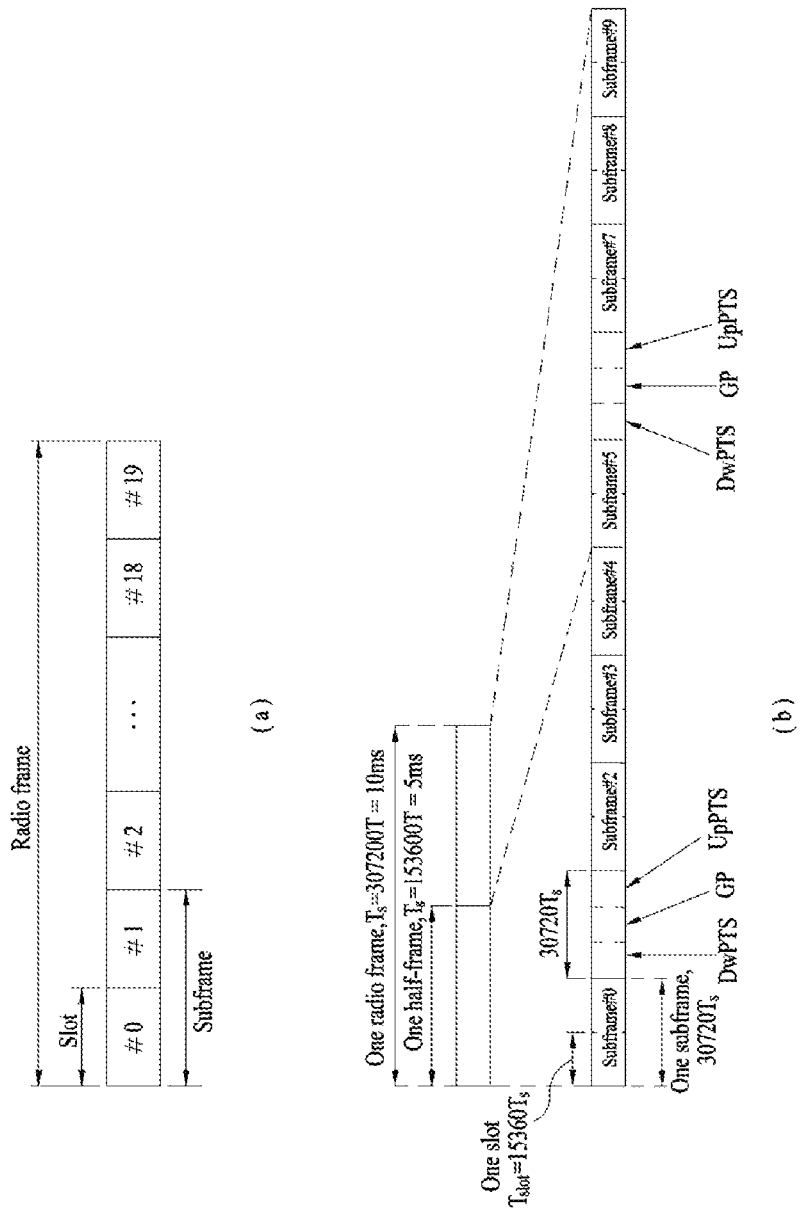
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless Packet communication system, uplink and/or downlink data Packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
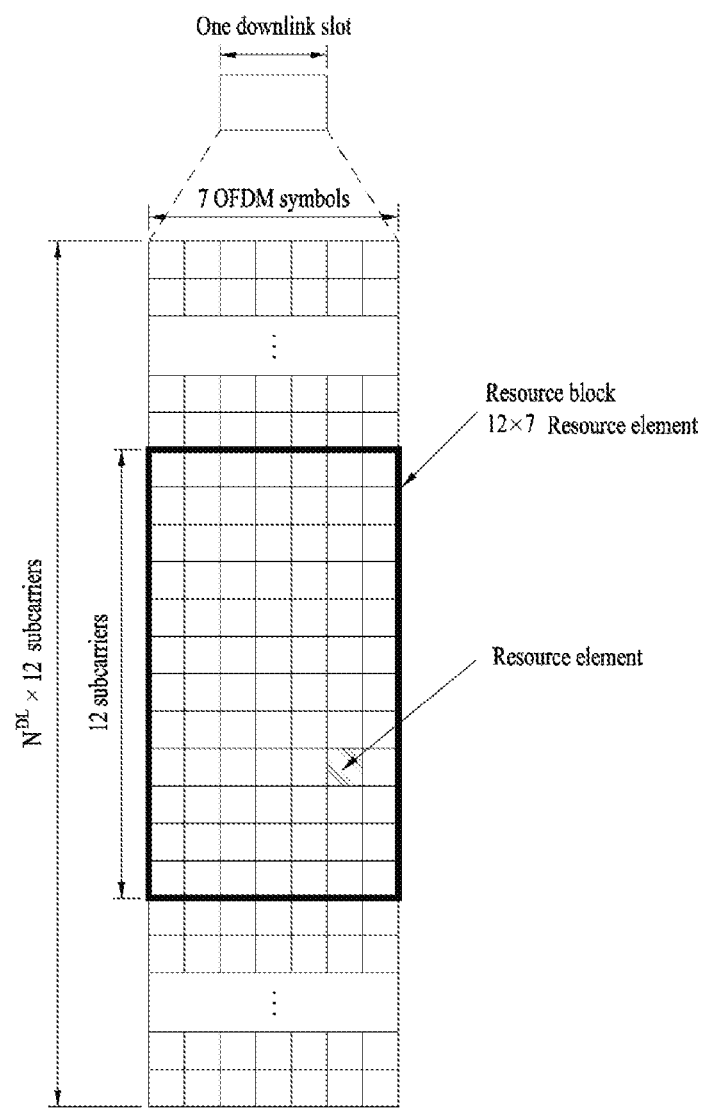
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
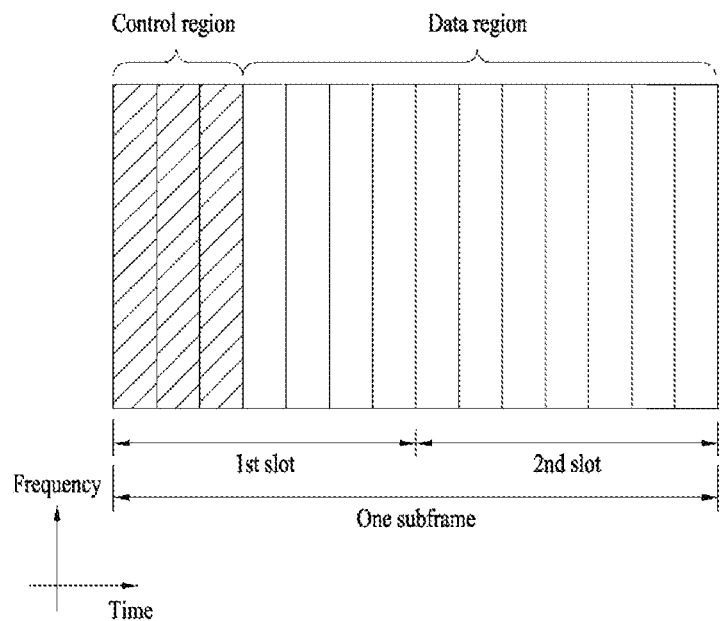
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI).

If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
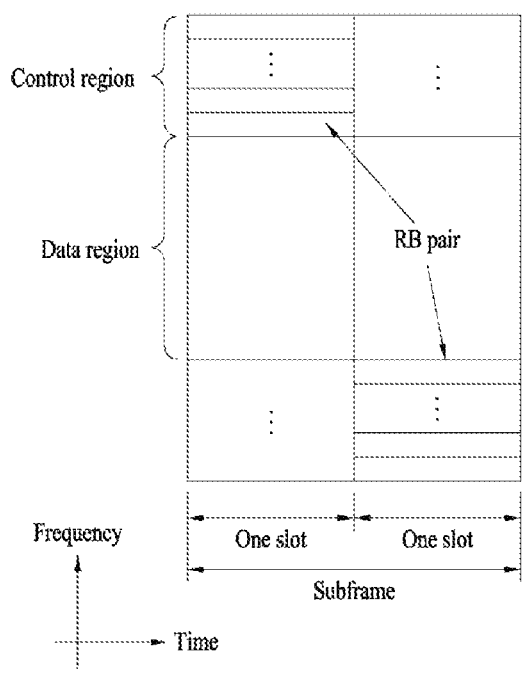
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a Packet is transmitted on a radio channel. In view of the nature of the radio channel, the Packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \Lambda, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$ [Equation 5]

$$W\hat{s} = WPs$$

In Equation 5, $W_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T$$ [Equation 6]

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}]$$ [Equation 7]

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix}$$ [Equation 8]

An AWGN (Additive White Gaussian Noise) is added to the actual channels after a channel matrix H. The AWGN $n_1, n_2, \ldots, n_{N_R}$ respectively added to the NR receive antennas can be expressed as follows.

$$n = [n_1, n_2, \ldots, n_{N_R}]^T$$ [Equation 9]

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R)$$ [Equation 11]

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

Figure 6:
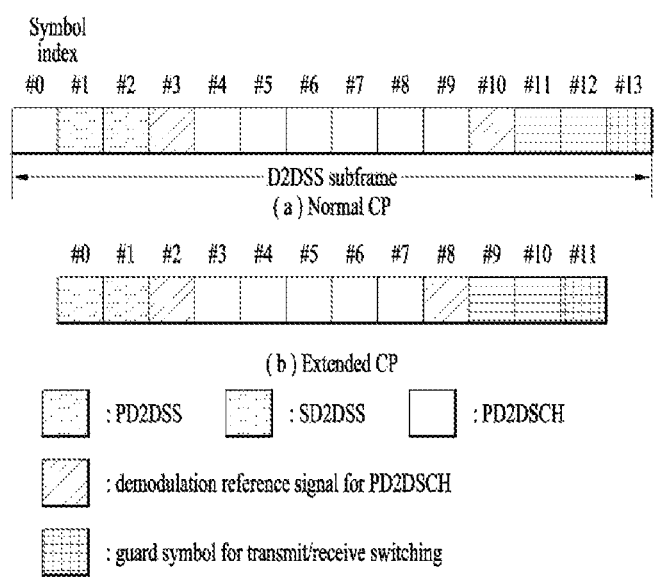
FIG. 6 is a diagram for a subframe in which a D2D synchronization signal is transmitted.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS). Unlike a DL PSS, the PD2DSS may use a different Zadoff-chu root index (e.g., 26, 37). And, the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
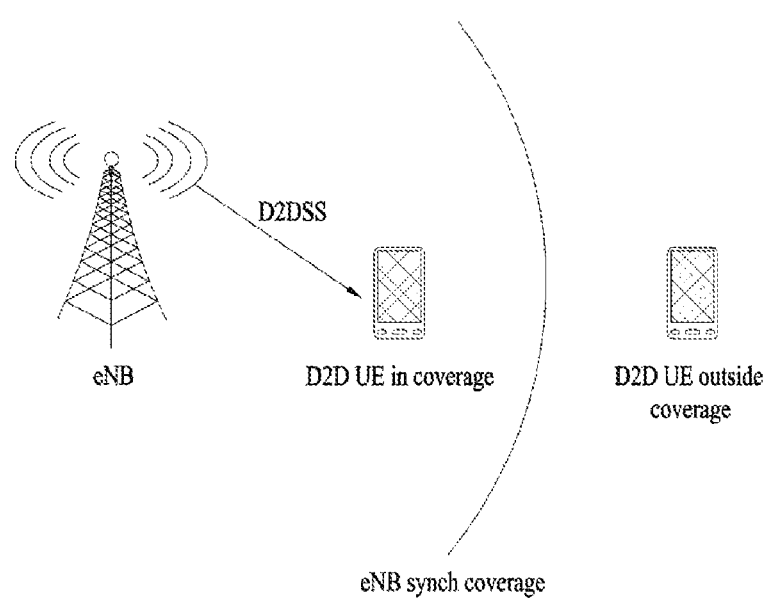
FIG. 7 is a diagram for explaining relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

D2D Resource Pool

FIG. 8 shows an example of a UE1, a UE2 and a resource pool used by the UE1 and the UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

Transmission and Reception of SA

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

Figure 9:
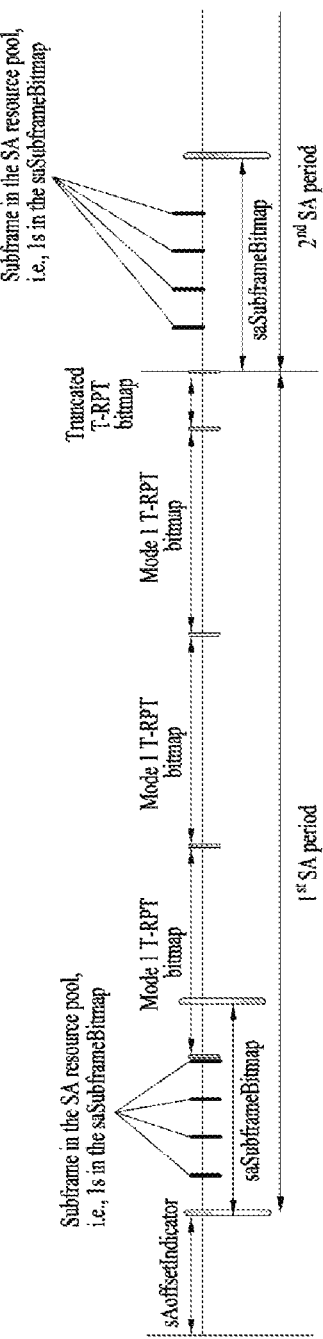
FIG. 9 is a diagram for explaining an SA period.

The SA period can be defined as FIG. 9. Referring to FIG. 9, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes. A transmission UE performs transmission at a position where a T-RPT bitmap corresponds to 1 in an indicated T-RPT and 4 transmissions are performed in a MAC PDU.

Figure 10:
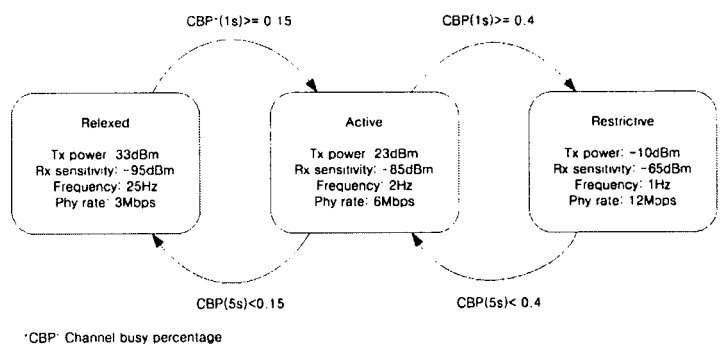
FIG. 10 is a diagram for explaining DCC (distributed congestion control)

FIG. 10 illustrates an operation scheme for DCC (distributed congestion control) defined in 802.11p. When a CBP (channel busy percentage) is measured by a UE, if load is equal to or greater than a certain level, the DCC changes a state (relaxed, active, restrictive). When the state is changed, not only Tx power but also Phy. rate, a sensing threshold, and a message transmission frequency are changed at the same time. And, inter message reception time is considerably changed according to the change of the state. When a state is changed, since too many parameters are changed at the same time, the DCC has a demerit in that it is difficult to identify a parameter that affects performance. When the DCC is performed, since congestion measurement (Occupation energy of a channel is measured for prescribed time. If the energy is equal to or greater than a threshold/upper limit, it is determined that the channel is in a busy state. If busy percentage is equal to or greater than a threshold or is equal to or less than the threshold in a specific time window, a state is changed) is performed by a UE, a congestion discordance phenomenon may occur between UEs. For example, when a UE group A determines a channel as busy and reduces channel access, a UE group B adjacent to the UE group A may determine that the channel is idle because the channel is not used by the UE group A and may have a high channel access parameter. In this case, a performance inequality phenomenon (a specific UE group continuously uses an active state, whereas a different specific UE group continuously uses a restrictive state) may occur between the UE group A and the UE group B. Or, a UE located at a specific region may switch a state between an active state and a restrictive state (or, between a relaxed state and an active state).

In the following, a method of solving the demerits (the congestion measurement of the UE, the performance inequality phenomenon, and the like) of the DCC and a method of controlling interference in an overcrowded region in V2X communication are described. Terminologies used in the following description are explained.

F-node: a device for controlling V2X communication at a fixed position or a device for providing help is referred to as a fixed node. The F-node may have a form of an eNB or a UE type. The F-node can also be referred to as an RSU (road side unit).

V-UE: a terminal mounted on a moving vehicle or a UE used by a driver of a moving vehicle is referred to as a V-UE.

P-UE: a terminal held by a person moving on a street is referred to as a pedestrian UE (P-UE). A person may move using a bicycle or a different moving means (Segway, electric wheel). In general, the P-UE corresponds to a terminal having mobility lower than that of the V-UE.

A UE may operate with a different behavior when all or a part of parameters i) to vii) is different.

i) MCS: modulation and coding or RB size ii) Tx power: Tx power of a terminal iii) Message generation period: A period of transmitting a message transmitted by a terminal (Or, a period of reserving a message. It may correspond to a period of reserving a resource when a terminal uses semi persistent transmission. In the following, unless there is a separate explanation, the message generation period includes an SPS period.)

iv) Repetition number: The number of retransmitting a single MAC PDU retransmitted by a terminal.

v) Sensing threshold/limit: When a terminal determines whether a channel is idle or busy, such a threshold/limit as RSSI or RSRP. Specifically, the threshold/limit may be associated with a sensing method. When sensing is performed, if a measurement value measured by a terminal is higher than the threshold/limit, the terminal determines that a channel is busy. Otherwise, the terminal determines that a channel is idle.

vi) Contention window (CW) size: If a terminal knows that a channel is empty in advance via other information or determines that the channel is idle, the terminal can decrease a backoff counter by 1 in a contention window. In other word, the counter is initially configured by a CW size and is decreased by 1 whenever a channel is idle. If the counter becomes 0, transmission is performed.

vii) Resource pool: A resource pool can be differently used according to a type of a UE, a message type, or geo-information (location, speed, orientation, etc.) of a UE.

UE Behavior Signaling of F-Node

An F-node signals a common measurement value and/or a UE behavior (all or a part of an MCS/MCS range, Tx power, a message generation period, a repetition number (range), a sensing threshold, and a contention size) to a V-UE via physical layer signaling or higher layer signaling and can make the V-UE, which has received the common measurement value and/or the UE behavior, operate according to the behavior indicated by the F-node. The UE behavior can be differently designated depending on a region. For example, a resource pool or a set of resources usable in the resource pool can be differently configured according to geo location information (location, speed, orientation, etc.) of a UE. In this case, the F-node can signal a UE behavior used in each of resource regions (a resource pool, a resource set, a resource subset in a resource pool) to a UE via physical layer signaling or higher layer signaling. If there is no F-node near a UE, a UE behavior (e.g., MCS, RB size, etc.) capable of being used according to a resource pool can be determined in advance.

The UE behavior signaled by the F-node can be determined based on measurement values measured by V-UEs. More specifically, a V-UE can signal a status (or, UE behavior) determined according to a measurement value and/or measurement to the F-node via physical layer signaling or higher layer signaling. The F-node can calculate a common measurement value of a corresponding region based on a status or a measurement value received from a nearby UE. The F-node can determine a UE behavior based on the calculated common measurement value and signal the determined UE behavior to a V-UE. The F-node can signals an average of measurement values received from a UE rather than the UE behavior to a V-UE via physical layer signaling or higher layer signaling. In order to set a common behavior among F-nodes, it may share a measurement value and/or all or a part of UE behavior-related parameters (MCS, Tx power, a message generation period (or SPS period), repetition (retransmission) number, a sensing threshold, and a contention window size) via a backhaul or a radio channel between F-nodes.

The F-node can designate a specific MCS scheme to be used by a UE. Or, the F-node can designate a range of an MCS usable in a corresponding region. In this case, as mentioned in the foregoing description, the MCS or the range of the MCS can be used by specific geo location information (location, speed, orientation, etc.) and/or a resource pool. For example, an MCS range used by a UE at a speed equal to or less than a threshold/limit can be signaled via higher layer signaling. If there is no F-node near a UE, a UE behavior (e.g., MCS, RB size, etc.) capable of being used according to a resource pool can be determined in advance. When a UE moves fast, this scheme can be usefully used for configuring MCS to be lower in consideration of a relative speed with a reception UE. If a UE autonomously determines MCS according to speed, the UE determines the MCS without considering relative speed with a reception UE. In this case, since F-nodes are able to know average relative speed between UEs in a corresponding region, if the F-nodes determines MCS or an MCS range optimized for transmission and reception of the UEs, transmission/reception performance between the UEs can be enhanced.

The F-node can forward information on a threshold/limit speed (range) to be used for an RRC-signaled UE behavior to a UE via higher layer signaling. In this case, the UE can use/apply UE behavior-related parameters (MCS/MCS range, Tx power, message generation period, repetition number (range), sensing threshold, contention window size) signaled via RRC signaling within an RRC-signaled speed range. Or, when speed of UEs is equal to or greater than a prescribed level, all or a part of Tx power of the UEs, MCS RB size, and the like can be signaled to a UE. More generally, a network (F-node) can signal a condition for which a UE configures a transmission parameter or an upper limit and/or a lower limit of a transmission parameter to a UE via physical layer signaling or higher layer signaling. In this case, each condition may correspond to geo location information of a UE, speed, load of a resource region (a ratio of occupied resources to resources belonging to a specific resource region), and the like.

Meanwhile, a behavior value of a different UE can be signaled depending on a message size or a priority. For example, it may be able to configure an event triggered message to more frequently and more quickly transmit a signal by setting a repetition value or a sensing threshold/limit value higher than that of a periodic message to the event triggered message. Among periodic messages, if a message is transmitted with a long interval (the message of the long interval can include security information on a message of a short interval and the like), the message transmitted with the long interval can be configured by a different UE behavior compared to a message transmitted with a short interval.

When a UE changes a UE behavior according to the aforementioned geo location information of the UE, the UE may change not only MCS and RB size but also transmit power.

Meanwhile, when a UE transmits feedback information to an F-node, a ratio of occupied resources to resources belonging to a specific resource region can be included in the feedback information. In this case, the ratio of the occupied resources to the resources belonging to the specific resource region can be calculated by three methods described in the following. A first method corresponds to a based on SA decoding method. A data resource associated with SA can be known via SA decoding. A UE can calculate a ratio of occupied resources in the entire data resource region. A second method corresponds to an energy sensing method. If energy (RSSI or RSRP (of an RS)) measured at a specific resource unit exceeds a prescribed threshold, it may consider it as a corresponding resource is occupied. A UE can calculate a ratio of occupied resources in the entire data resource region. A third method corresponds to a method based on both SA decoding and energy sensing. It may be able to signal all or a part of an average energy amount measured at a specific resource region, average RSSI/RSRP/RSRQ between D2D UEs, a ratio of dropped packets, and an average decoding success/failure rate in a specific resource region via physical layer signaling or higher layer signaling. In this case, separate information can be signaled as a transmission mode (mode 1 or mode 2) of a UE according to a resource region. To this end, an F-node can indicate a D2D UE to report a measurement result measured at a specific resource region via physical layer signaling or higher layer signaling. All or a part of D2D UEs can signal measurement information to the F-node (with a predetermined rate, a rate indicated by a network, a predetermined interval, or an interval indicated by the network) via physical layer signaling or higher layer signaling. F-nodes collect the information and may utilize the information for such an operation as configuration of a transmission parameter of a UE, reconfiguration of a resource region, change between Mode 1/Mode 2, and the like. And, the information can be directly utilized by the UE. The UE may refer to the information for configuring a transmission parameter of the UE (all or a part of transmit power, resource size (RB size, retransmission count), MCS, and the like). If the UE is indicated to report the information, the UE can periodically or aperiodically report the information via physical layer signaling or higher layer signaling.

Meanwhile, if there is no F-node, parameters of a UE behavior can be determined in advance. In this case, it may use a different contention parameter depending on a message type. For example, it may use a different parameter according to a priority of a message. The priority of the message can be determined in an order of Event triggered message>Periodic message with security information>periodic message without security information. A priority according to a message can be determined by a higher layer. In this case, the event triggered message corresponds to a message which is transmitted when a specific event occurs. An accident, danger, and the like can be notified via the event triggered message. The periodic message with security information (or, a long period periodic message) may correspond to a periodic message transmitted with a relatively long period and may have security information of a message transmitted with a short period.

The periodic message without security information (or, a short period periodic message) may correspond to a periodic message transmitted with a relatively short period and may correspond to a frequently transmitted message after the long period message. For example, if a message has a higher priority, it may configure a repetition number to be bigger to make the message have higher access probability (A CW can be configured to be smaller than a message of a low priority. Or, a sensing threshold/limit is configured to be higher. (More specifically, a UE compares a priority of a message to be transmitted by the UE with a priority of a message occupying a resource. If the priority of the message to be transmitted by the UE is higher, a higher sensing threshold is set to the message to make the UE have an opportunity of using the resource. To this end, an F-node can signal a sensing threshold according to a priority to the UE via physical layer signaling or higher layer signaling.)) All or a part of parameters (MCS/MCS range, Tx power, message generation period, repetition number (range), sensing threshold, contention window size) can be differently configured according to a priority. When a parameter is configured according to a priority, the priority can be determined in advance according to a message type or contents.

UE Behavior Signaling of UE

UEs (or V-UEs) can transmit all or a part of parameters for measuring or determining behaviors of the UEs in a manner of including the parameters in a control signal which is transmitted or piggy backed together with SA (control signal), a MAC header (or, MAC CE or a different higher layer field) of data, or data. In this case, a behavior or a measurement can be shared between UEs without an F-node and it may refer to the behavior to determine a behavior of the UE. All or a part of parameters including MCS, Tx power, Message generation period, Repetition number, Sensing threshold, Contention window size and the like can be included in a MAC header (or, MAC CE or a different higher layer field) of a UE or SA. For example, if MCS, message generation period, Tx power, CW size, a threshold/limit are transmitted in a manner of being included in the SA or the MAC header (or, MAC CE or a different higher layer field), a UE can determine a behavior of the UE in consideration of behaviors of nearby UEs.

Among the aforementioned UE behavior signal of a UE, a message generation period may correspond to semi persistent scheduling for maintaining a current resource allocation after X ms. In particular, the current resource allocation can be maintained after X ms according to a value of the message generation period. An SPS period value can be transmitted in a manner of being included in SA. An SA period (or, a message generation period) interval or the number of SA periods can be transmitted in a manner of being included in SA to indicate the number of SA periods during which a current resource allocation is to be maintained in the future.

Specifically, a UE selects an information bit related to resource reservation to be included in control information and can transmit the control information via a channel on which the control information is forwarded. In this case, the information bit can indicate whether or not the UE reserves a resource. If the UE reserves a resource, the information bit can also indicate a position of the resource. In particular, a method of indicating a length of a period for indicating reservation of a resource in a next transmission and a method of indicating whether or not reservation is made in a next period can be implemented in a manner of being combined. For example, if a UE does not reserve a resource, 0 is selected as a value of the information bit. If a UE reserves a resource, a value rather than 0 is selected as the value of the information bit. The UE can transmit data after a time period corresponding to the value rather than 0 is elapsed. As a different example, 2-bit state can be transmitted in a manner of being included in SA. In this case, a bit state 00 indicates that reservation is not performed. Bit states 01, 10, and 11 may indicate an SPS period length. As a further different example, a UE can configure an SPS period ranging from 100 ms to 1000 ms. In this case, a field of 4 bits can be transmitted in a manner of being included in SA. In this case, 00 may indicate that a resource is not reserved in a next period.

Figure 11:
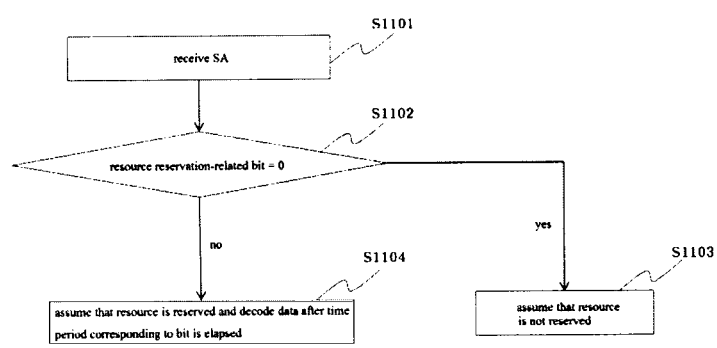
FIG. 11 is a flowchart for explaining one embodiment of the present invention.

Referring to FIG. 11, a reception UE receives control information via a channel on which the control information is forwarded [S1101] and can check an information bit related to resource reservation included in the control information. As mentioned in the foregoing description, the information bit can indicate whether or not the UE reserves a resource. If the UE reserves a resource, the information bit can also indicate a position of the resource. Hence, the reception UE can determine whether or not a value of the information bit related to resource reservation corresponds to 0 [S1102]. If the information bit corresponds to 0, the UE can anticipate/assume/premise that the UE, which has transmitted the control information, does not reserve a resource [S1103]. If the information bit corresponds to a value rather than 0, the UE can anticipate/assume/premise that the UE, which has transmitted the control information, reserves the same frequency resource after a time period corresponding to the information bit and transmits data after the time period corresponding to the information bit [S1104]. In this case, if the UE corresponds to a UE receiving data corresponding to the control information, the UE can decode the data in a frequency resource identical to a resource in which the data is received after the time period. If the UE corresponds to a UE not receiving data corresponding to the control information, the UE can exclude a frequency resource in which the data is received after the time period when the UE selects a transmission resource.

In the foregoing description, a value selected as an information bit may correspond to a value permitted by a period-related parameter which is forwarded by an F-node via higher layer signaling. In particular, when a UE transmits data, the UE selects an information bit related to resource reservation according to UE behavior signaling of the F-node. More specifically, a first message can be transmitted via a time-frequency resource. If it is necessary for a UE to transmit a second message related to the first message, the UE can transmit the second message via a frequency resource region identical to a frequency resource region among the time-frequency resource after prescribed time is elapsed from the time-frequency resource. In this case, the prescribed time is determined by a bit (the information bit related to resource reservation) selected by the UE from among a plurality of bits. Bits capable of being selected by the UE from among a plurality of the bits can be permitted by a period-related parameter forwarded via higher layer signaling. Whether to permit the bits can be indicated by a bitmap via higher layer signaling. For example, it may signal usable period information among 10 states including 100, 200, . . . , 1000 to a UE in a bitmap form. For example, a bitmap 1010101010 may indicate that a UE is able to use such a period as 100, 300, 500, 700, and 900 only. The period-related parameter can be transmitted from an F-node (fixed node) related to a UE. In particular, resource reservation can be appropriately controlled by the F-node. In this case, it may prevent such an operation that a UE indiscreetly reserves a resource appearing after long time. As an extreme case, the F-node can always configure a specific period (e.g., 100 ms) as an SPS period only used by UEs. In this case, the F-node configures all UEs to transmit a message with the specific period.

Besides the selection of the information bit related to resource reservation, UE behavior signaling of the F-node can control various operations of a UE described in the following. For example, if a second message corresponds to a retransmission of a first message, the second message can be transmitted within a retransmission count. In this case, the retransmission count can be forwarded to a UE via higher layer signaling. When the first message is transmitted, it may use MCS within a range indicated by higher layer signaling. The MCS can be used when a UE is within speed equal to or less than threshold speed or a specific speed range. The speed equal to or less than the threshold speed or the specific speed range can be forwarded via higher layer signaling.

A resource for control information and a resource for data corresponding to the control information can be selected at the same time. In particular, when SA and data are reserved together, both the SA and the data can be reselected. The SA is transmitted in a manner of including information on whether or not the SA and the data are reserved. In this case, reservation/reselection can be performed on both the SA and the data. Once the SA and the data are determined by sensing, if it is checked that a collision occurs on either the SA or the data, a resource selection change (reselection) is performed on both the SA and the data. In particular, according to the abovementioned method, if the SA and the data are reserved, since an SA resource and a data resource are maintained, it may be able to stably estimate an amount of interference affecting a different UE. In addition, if reselection of the SA and reselection of the data are performed at the same time, it may be able to prevent unnecessary reselection and stably measure interference of a UE.

It may indicate reservation of the SA and reservation of the data, respectively. It may be able to transmit the SA in a manner of including reservation (SPS or message generation) periods of the SA and the data and information indicating whether or not the SA and the data are reserved in the SA. According to the present method, information on whether or not an SA resource transmission is maintained in a next SPS period and information on whether or not a data resource transmission is maintained can be transmitted in a manner of being included in the SA. According to the present method, since resource selection maintenance information is most flexibly included, when a collision occurs on the SA, the data, or both the SA and the data, it may be able to directly indicate whether to perform reselection. For example, if a collision occurs on a resource of the SA due to a different UE, information on whether to perform reservation of the SA is released. Hence, the SA performs reselection in a next transmission and the data maintains reservation and does not perform any separate reselection procedure. In particular, in this case, an indicator indicating whether or not a resource allocation of a current SA period is maintained in a next message transmission can be transmitted in a manner of being included in the SA using 1 bit according to the SA and the data. Nearby UEs are able to know whether or not each of the SA and the data is reserved according to the indicator.

The SA randomly selects a resource, selects a resource according to a predetermined hopping pattern, or selects a resource by performing sensing to indicate whether or not data is reserved. In particular, SA transmits information on whether or not the data is reserved. According to the present method, the SA can select and transmit an SA resource whenever data is transmitted (every SA period). For example, a specific SA resource index interlocked with an SA ID is selected in every SA period and the selected specific SA resource index can be used for SA transmission. Or, an SA resource can be randomly selected and transmitted whenever data is transmitted. Or, an SA resource can be selected via sensing whenever data is transmitted. When SA resource allocation is performed using sensing, if the same resource is continuously selected, a collision can be consistently occurred with a specific UE having a similar sensing result. In order to prevent the consistent collision, a resource can be randomly selected from among the remaining SA resources except a resource of energy less than a prescribed threshold or a resource preoccupied by a different UE. Or, a resource can be selected by a UE ID.

Meanwhile, SA can be transmitted according to a predetermined hopping pattern (a hopping pattern for solving a half-duplex problem) whenever data is transmitted. In this case, an optimized resource can be determined by sensing among the hopping pattern. When energy of the SA is measured, SA resource positions where SA retransmission is performed are regarded as an SA resource group and measurement values are averaged to perform measurement of an SA resource. A UE knows an SA hopping pattern according to an SA resource in advance, performs measurement according to an SA resource, and averages measurement according to an SA resource group in accordance with a hopping pattern of an SA resource. The UE randomly selects an SA resource from among a group of SA resources of which energy is equal to or less than X % to transmit SA. As an extreme case, the UE may select an SA resource group of least energy. The abovementioned method corresponds to a method that a merit of a method for a UE to randomly determine an SA resource is combined with a merit of a method of determining an SA resource by sensing energy. If an SA resource is determined by measuring energy only, it is unable to completely solve a half-duplex problem of SA between UEs. When an SA resource is randomly determined whenever data is transmitted, although a data resource is determined based on sensing, SA transmission randomly occurs and reception performance of data can be degraded due to in-band emission. If the half-duplex problem of the SA is solved, optimized energy is identified and transmitted, and the optimized energy is maintained during a prescribed data transmission period, data sensing can be stably performed as well.

Meanwhile, a reservation period of data and a reservation period of SA can be configured by a different period. For example, the data performs reservation during 1000 ms, whereas the SA can perform reservation in every 200 ms.

Meanwhile, when a UE measures interference of a nearby UE, the UE can measure the interference via SA decoding, measure energy of data, or measure energy of SA. A network can signal a method of performing sensing among the abovementioned methods to a UE via physical layer signaling or higher layer signaling. If each of the methods is configured to be used, the network can signal a related threshold/limit value parameter to the UE. For example, the network can indicate a specific region or specific UEs to perform SA decoding-based sensing. Or, the network can indicate the specific UEs to use both SA decoding and data energy measurement. The UE can select resources of which energy is less than a prescribed threshold from among the remaining resources except a resource occupied via SA decoding. Or, the network can indicate resource selection to be performed using energy measurement of data only. In this case, the UE can perform resource selection/reselection based on the energy measurement of data.

Measurement and Signaling of F-Node

An F-node performs measurement and informs a UE of a measurement value. Or, the F-node can signal a UE behavior based on a measurement of a UE. By doing so, it may be able to reduce a problem of differently determining a current channel state. The problem may occur when the timing of performing measurement and/or a position of a UE performing measurement is different. For example, the F-node collects measurement results of UEs and can determine a behavior of a UE of a corresponding region. More specifically, it may consider a method described in the following.

The F-node measures congestion near the F-node and can signal the measured congestion to a V-UE. The F-node measures RSSI or a busy level of a channel (e.g., when the F-node measures RSRP of an RS transmitted by a UE, a ratio of exceeding a predetermined threshold or time of exceeding a threshold in a specific window) and can signal the RSSI or the busy level of the channel to a V-UE and/or a P-UE via physical layer signaling or higher layer signaling. The UE does not simply use the value measured by the F-node as it is. Instead, the UE shares the measurement value with nearby F-nodes via a wired backhaul (e.g., X2 interface or a separate wired backhaul) or an air interface and the nearby F-nodes signal the measurement value to the UE. In particular, each of the F-nodes averages measurement values with the nearby F-nodes or a UE behavior (or, UE state) (in case of a behavior/UE state, a common behavior is determined) and signal the averaged measurement value to the UE.

The UE performs weighted average on the measurements measured by each of the F-nodes to make nearby UEs have a common behavior of a certain level. For example, when two F-nodes (F-nodes 1 and 2) are examined and reception strength of a signal received from each of the F-nodes corresponds to A and B [Watt], the UE can smooth the measurement values by determining (A*F-node 1's measurement+B*F-node 2's measurement)/(A+B). In this case, it is not restricted to the weight average of the two measurement values. It may also be able to perform measurement (weighted) averaging on an F-node at which signal strength equal to or greater than a prescribed threshold is received.

The UE does not use the value signaled by the F-node as it is. The UE can determine a final behavior by using a value measured by the UE as well as the value signaled by the F-node. If the measurement measured by the UE is not reflected, since actual measurement is not reflected, it is not preferable. A ratio of reflecting the measurement measured by the UE can be signaled by a network or the F-node via physical layer signaling or higher layer signaling. For example, the ratio can be differentiated according to density of F-nodes in a specific region. If density of F-nodes is high, a higher weight is applied to a measurement value signaled by an F-node. If density of F-nodes is low, a lower weight is applied to a measurement value signaled by an F-node.

Method of Determining UE Behavior Determined by UE

If a frequency (message generation period) of transmitting and/or receiving a message is simply controlled by a load or congestion of a channel, inter message reception and/or transmission time of a specific UE can be extended. As mentioned in the foregoing description, if a frequency of transmitting and/or receiving a past message is equal to or less than a prescribed level, it may consider a method that the specific UE increases the frequency again. In particular, a UE can determine a current behavior with reference to a past behavior to prevent performance degradation of a specific UE instead of determining a behavior of the UE in consideration of a load or congestion of a current channel.

For example, if a UE is previously configured to transmit a message with a long specific time period (message generation period), it may be able to determine a rule that the UE performs transmission with a short message generation period. As a different example, if a UE is previously configured with Tx power of A dBm during a specific time period, it may be able to determine a rule that the UE performs transmission with Tx power of B dBm after the specific time period is elapsed. The abovementioned operation can be applied not only to a transmission operation of a message but also to a reception operation of a message. If it fails to receive a message of a specific type during prescribed time, it may extend a length of a reception window of the message or configure a period for monitoring the message to be short to increase a reception rate.

Monitoring Method of P-UE

In case of a P-UE, due to a battery problem, it might be a burden for the P-UE to always perform monitoring. Hence, the P-UE may intermittently wake up and perform a monitoring operation. In this case, it may consider specific operations described in the following.

As a first operation, a transmission pool or a reception pool for the P-UE only can be signaled by an F-node via physical layer signaling or higher layer signaling or can be determined in advance. Meanwhile, a resource pool for the P-UE can be configured with a relatively long period in consideration of battery consumption of the P-UE (e.g., 1 second, 100 ms section). P-UEs may assume that a V-UE does not perform transmission in a transmission pool for the P-UE only. The P-UE performs sensing in the transmission pool for the P-UE only and may be then able to perform transmission. In this case, no UE may perform transmission in an initial partial section of the pool for the P-UE. Hence, all or a part of UE behavior parameters can be differently configured in the transmission pool for the P-UE in a manner of being different from those of a V-UE. Or, all or a part of UE behavior parameters can be configured in a manner of being different from a V-UE according to a UE type irrespective of the pools of the P-UE and the V-UE. In order to prevent a case that no P-UE performs transmission in the initial part of the pool, P-UEs may randomly determine a resource and transmit a signal in the initial partial section (or, a resource used by the P-UE) of the pool for the P-UE or it may configure a predetermined sequence or a codeword to be transmitted at a random time position. By doing so, it may be able to configure other P-UEs to identify an approximate level of congestion. Meanwhile, it may be able to configure the P-UE not to transmit an SLSS in every SLSS transmission period for a battery saving operation. To this end, the P-UE can perform SLSS transmission in an SLSS resource closest to the forepart of the resource pool for the P-UE, the N number of SLSS resources close to the forepart of the pool for the P-UE, and/or an SLSS resource within the resource pool configured for the P-UE. The SLSS transmitted by the P-UE is distinguished from an SLSS transmitted by a V-UE using a format of the SLSS or an ID of the SLSS. The SLSS transmitted by the P-UE can be indicated via a PSBCH field. Or, the SLSS transmitted by the P-UE can be transmitted using an ID indicated by an RSU or PSBCH.

As a second operation, if all P-UEs are aligned with a transmission pool for a P-UE only, the P-UEs may fail to listen to a mutual signal due to a half-duplex constraint. Or, due to in-band emission between P-UEs, it may be difficult for other UEs to smoothly receive a signal. In order to solve the problems, the transmission pool of the P-UE is divided into the N number of sub-pools (or, a period of a specific P-UE group among the transmission pool of the P-UE can be divided in advance) and transmission can be performed in a different sub-pool. A P-UE performs monitoring in sub-pools except a sub-pool in which the P-UE performs transmission to identify an approximate level of congestion. The sub-pool in which the P-UE performs transmission can be randomly determined. A value resulted from performing modular N on an ID of the P-UE can be used as a seed value for determining a sub-pool of the P-UE. Or, an F-node may signal an index of a sub-pool in which the P-UE performs transmission or a seed value for selecting a sub-pool via physical layer signaling or higher layer signaling. Or, when a method of selecting a pool is determined in advance based on signal strength of a specific F-node or signal strength of a UE, if a specific condition is satisfied, a corresponding pool can be used. In this case, in order to prevent a transmission from being continuously performed in the same UE group and the same sub-pool, a sub-pool can be randomly selected in every period. Or, it may hop a sub-pool using an SA ID of a UE.

As a third operation, when a P-UE (intermittently) wakes up with a period longer than a period of a V-UE and receives a message, if the P-UE fails to receives a V2X message or a relatively important message (e.g., a security message), the P-UE may additionally wake up and attempt to receive the message. For example, if density of vehicle UEs is very high, a transmission period of a V-UE may become longer or a message can be more frequently transmitted. In this case, assume that a P-UE performs an operation of receiving a signal of the V-UE by waking up 100 ms of 1 second. Yet, in this case, since density of the V-UE is too high, the P-UE may fail to properly receive a message. In this case, the P-UE additionally wakes up as much as 100 ms and attempts to receive the message. If a message is identical to the message of the previous 100 ms, the P-UE may attempt to combine the messages. Or, the P-UE may receive the message using a new scheme. By doing so, the P-UE can receive messages of more V-UEs. The wake up time extension extended by the P-UE according to a reception rate can be determined in advance or a network can configure all or a part of an interval of the wake up time, a section length, and a length of additional wake up time according to occurrence of congestion. In this case, in order to distinguish a case of failing to receive a message from a case of not transmitting a message at all, when specific SA or data measures high energy or RS power, if it fails to receive data on a corresponding channel, it can be regarded as the case of failing to receive a message. Moreover, when energy sensing or SA is read in advance, it is anticipated that data is to be received in a corresponding resource region, and decoding is performed, if CRC is failed, it can be regarded as a case that a message is transmitted but it fails to receive the message. If a message reception rate or the number of not received messages is equal to or greater than a prescribed threshold, wake up time is additionally extended to attempt to additionally receive a V2X message. To this end, it may explicitly signal a type of a reception message to a different UE via SA. Or, it may differently configure a physical layer format (DMRS sequence, CS, or OCC is differently configured according to a message type) or an explicit physical layer indicator can be transmitted in a manner of being included in a certain region of a data RE.

As a fourth operation, if a P-UE fails to receive a message of a specific type during a wake up time window, the P-UE additionally wakes up and can perform a receiving operation. For example, if the P-UE fails to receive a security message among an event triggered message and a periodic message, the P-UE additionally wakes up and may attempt to receive the security message.

As a fifth operation, when a P-UE performs reception in a predetermined wake up window, if the P-UE fails to receives a message in the window during prescribed time (in this case, in order to distinguish a case of failing to listen to a message due to the lack of the message from a case of failing to listen to a message due to severe interference, a case of failing to receive a message when a signal energy level is equal to or greater than a prescribed threshold (in this case, an energy level threshold/limit can be determined in advance or can be configured by a network)), it may reduce a wake up interval of the P-UE to make the P-UE more frequently wake up and listen to a message. In this case, the wake up interval can be determined in advance or can be configured by a network. If a specific condition (e.g., the number of messages received during wake up time, a reception rate less than a certain threshold), which is determined in advance or configured by a network, is satisfied, a UE configures the wake up interval to be short to attempt to additionally receive a V2X message.

As a sixth operation, although it is able to make a length of a window in which a P-UE performs wake up vary, a period for which the P-UE performs wake up can also be differently configured according to surroundings or a status of a UE to reduce battery consumption to a certain level. For example, if the P-UE receives a message during 500 ms for a certain reason, a wake up interval of the P-UE can be configured to be longer (e.g., 5 seconds) than 500 ms in consideration of battery consumption. If congestion occurs and a nearby V-UE modifies a message generation period to be long, a P-UE is unable to receive all signals of neighboring V-UEs at a time. In this case, it is preferable to align a message reception window in which the P-UE wakes up and listens to a signal with the message generation period of the V-UE. Yet, in this case, battery consumption of the P-UE may excessively increase. Hence, a message reception period of the P-UE is increased together to mitigate a burden for the battery consumption of the P-UE.

As a seventh operation, a message transmission period and/or a message reception period or a message transmission window size and/or a message reception window size may vary according to mobility of a P-UE. For example, a P-UE may move fast using a bicycle or a different transportation means. In this case, a message transmission and/or reception window/period can be differently configured according to a state or status of the P-UE. For example, if a P-UE recognizes a situation that the P-UE is getting on a vehicle or the P-UE receives an indication indicating the situation from a higher layer, the P-UE can perform a message generation transmission/reception operation similar to that of a V-UE. As a different example, if a P-UE recognizes a situation that the P-UE is getting on a bicycle or the P-UE receives an indication indicating the situation from a higher layer, the P-UE may more frequently wake up and listen to a message of a nearby V-UE. Or, the P-UE may perform an operation of receiving a message of a V-UE for a long time.

As an eighth operation, when a mode of a P-UE is changed according to mobility, status, or an indication of a higher layer, the P-UE ma use a separate resource pool different from a transmission pool used by a legacy P-UE or a V-UE. For example, if a higher layer informs a UE that the UE is getting on a vehicle, although the UE corresponds to a P-UE, the UE may follow a resource pool and a behavior of a V-UE. In particular, when a V2X operation is performed, a behavior of a UE is not a unique characteristic of the UE. The behavior of the UE can be changed by an indication indicated by a higher layer signal. If it is able to change the behavior of the UE according to a state of the UE, it is able to perform an optimized operation in accordance with the status of the UE. To this end, the present invention proposes a method that a higher layer (e.g., application layer) recognizes a status of a UE and transmits an indicator for reflecting the status of the UE to a physical layer operation or a MAC layer operation. In order to perform the abovementioned operation, a network can determine a behavior level of a UE in advance. If the UE informs the network of a status of the UE, surrounding interference information, and the like, the network can indicate the UE to operate with a specific behavior. Or, the network can signal an operation to be performed by the UE according to environment to which the UE belongs thereto to the UE in advance via physical layer signaling or higher layer signaling. If the UE faces the situation, the UE can operate with the behavior indicated by the network. For example, when a P-UE is getting on a vehicle or a bicycle, if the P-UE recognizes the situation, the P-UE reports a measurement to a network, or the network configures a behavior of the P-UE in advance for the situation, the P-UE can operate with the behavior configured for the situation.

Meanwhile, a reception UE may or may not listen to a signal according to a transmission UE type or a message type. Battery consumption of the reception UE can be reduced by making a physical layer distinguish the cases from each other. To this end, a type of a UE and/or a message type can be transmitted in a manner of being explicitly included in an ID of SA or SA. Or, it may be able to differently configure a DMRS sequence or it may be able to transmit an indicator indicating a UE type and/or a message type in a manner of including the indicator in a partial region of data. For example, it may be not necessary for a P-UE to listen to a signal of a different P-UE. To this end, a UE can transmit an indicator indicating whether the UE corresponds to a P-UE or a V-UE by including the indicator in SA. In a broad sense, the UE can transmit a different indicator according to a message type or a packet type. For example, among messages transmitted by a V-UE, one message can be transmitted for a P-UE and another one can be transmitted for the V-UE. In particular, in order to make a reception UE not to perform an unnecessary reception operation according to a type of a message, a method of dividing a resource region into sub-resource regions and/or a method distinguishing the sub-resource regions from each other in a physical layer are proposed. The two methods can be implemented in a manner of being combined or can be implemented independently. If a message type or a UE type is determined in advance according to a resource region, it is not necessary for a UE to receive the whole of the resource region, thereby considerably reducing power consumption. Or, although a resource region is not divided, when SA of an SA pool is received, if SA of a UE, which is not necessary to listen to, is received, since data decoding is not performed, power consumption of a UE can be reduced.

Meanwhile, a P-UE may fail to receive such a message transmitted with a relatively long period as a security message among messages transmitted by a V-UE. For example, when the V-UE transmits a periodic message in every 100 ms and transmits a security message in every 500 ms, the P-UE may listen to messages received during 100 ms only by temporarily waking up due to a better consumption issue. In this case, the P-UE may fail to receive the security message. In this case, the present invention proposes a method that an eNB or an RSU broadcasts a security message of a nearby V-UE. The eNB or the RSU may signal a security message of a V-UE to a P-UE via separate physical layer signaling or higher layer signaling. Although the P-UE is unable to receive security messages of all V-UEs while waking up, the P-UE is able to interpret the message of the V-UE using a message signaled by the eNB or the RSU.

Meanwhile, all or a part of the proposed operations are not restricted to operations of a P-UE. The proposed operations can be extensively applied to a V-UE as well. On the contrary, an operation of the V-UE can be applied to the P-UE as well.

Examples for the aforementioned proposed methods can also be included as one of implementation methods of the present invention. Hence, it is apparent that the examples are regarded as a sort of proposed schemes. The aforementioned proposed schemes can be independently implemented or can be implemented in a combined (aggregated) form of a part of the proposed schemes. It may be able to configure an eNB to inform a UE of information on whether to apply the proposed methods (information on rules of the proposed methods) via a predefined signal (e.g., physical layer signal or upper layer signal).

Configurations of Devices for Embodiments of the Present Invention

Figure 12:
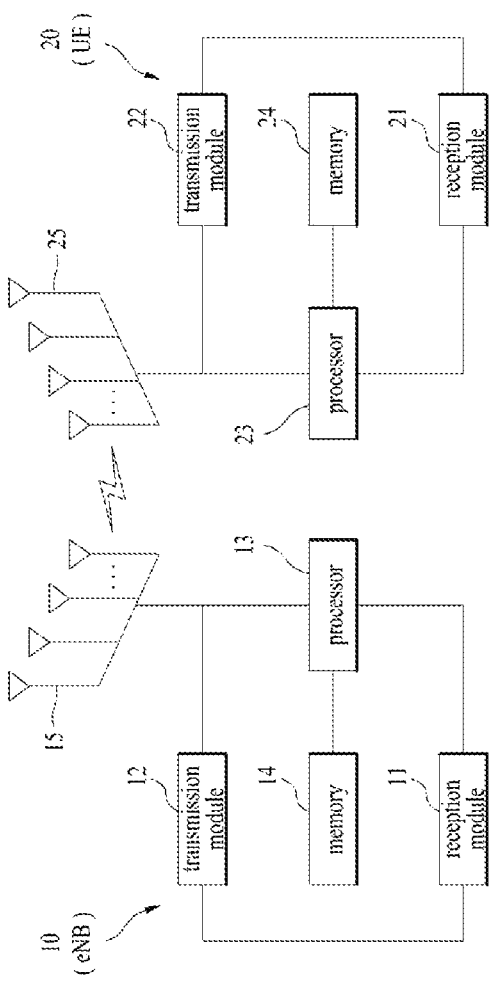
FIG. 12 is a diagram for configurations of a transmitter and a receiver.

FIG. 12 is a diagram for configurations of a transmitter and a receiver.

Referring to FIG. 12, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 12, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 12 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to various mobile communication systems.

What is claimed is:

1. A method of receiving or transmitting data, by a first user equipment (UE) in a vehicle-to-everything (V2X) wireless communication system, comprising the steps of:
    receiving, by the first UE from a second UE, control information through a control channel; and
    receiving or transmitting, by the first UE, a first data based on a first frequency resource in a subframe N indicated by the control information,
    wherein the control information includes information bits indicating both an interval (I) and whether the second UE keeps the frequency resource, and
    wherein the first UE receives a second data from the second UE on the frequency resource in a subframe N+I, when the information bits indicates second UE keeps the frequency resource and the first data indicated by the control information is for the first UE.

2. The method of claim 1, wherein the information bit corresponds to 0, when the second UE does not keep the frequency resource.

3. The method of claim 1, wherein a resource for the control information and a resource for a data corresponding to the control information are always selected at the same time.

4. The method of claim 3, wherein the control information and data corresponding to the control information are transmitted in a manner of being frequency division multiplexing (FDM).

5. A user equipment (UE) for receiving or transmitting data in a vehicle-to-everything (V2X) wireless communication system, the UE comprising:
    a transceiver; and
    a processor operatively connected to the transceiver and configured to:
    receive, from a second UE, control information through a control channel; and
    receive or transmit a first data based on a first frequency resource in a subframe N indicated by the control information,
    wherein the control information includes information bits indicating both an interval (I) and whether the second UE keeps the frequency resource, and
    wherein the UE receives a second data from the second UE on the frequency resource in a subframe N+I, when the information bits indicates the second UE keeps the frequency resource and the first data indicated by the control information is for the first UE.

* * * * *